United States Patent [19]
Singh et al.

[11] Patent Number: 6,011,239
[45] Date of Patent: Jan. 4, 2000

[54] LASER APPARATUS AND METHOD ADJUSTING THE GRAM LOAD, STATIC ATTITUDE AND FLYING HEIGHT IN A HEAD SUSPENSION ASSEMBLY

[75] Inventors: Gurinder P. Singh; Satya P. Arya; Douglas J. Krajnovich; Timothy O'Sullivan; Pantelis S. Alexopoulos, all of San Jose, Calif.; Chih-Kung Lee, Taipei, Taiwan

[73] Assignee: International Business Machines Corporation, Armonk, N.Y.

[21] Appl. No.: 09/007,738

[22] Filed: Jan. 15, 1998

Related U.S. Application Data

[62] Division of application No. 08/531,214, Sep. 19, 1995, Pat. No. 5,712,463.

[51] Int. Cl.[7] .................................................. B23K 26/00
[52] U.S. Cl. .............................. 219/121.6; 219/121.76; 219/121.85
[58] Field of Search ........................... 219/121.6, 121.62, 219/121.65, 121.66, 121.76, 121.83, 121.85, 121.78, 121.61; 29/603.01, 603.03, 603.12; 72/342.1, 364; 360/109

[56] References Cited

U.S. PATENT DOCUMENTS

| | | | |
|---|---|---|---|
| 3,588,440 | 6/1971 | Morse | 219/121.65 |
| 4,603,567 | 8/1986 | Smith et al. | 72/16.9 |
| 4,777,544 | 10/1988 | Brown et al. | 360/75 |
| 4,853,810 | 8/1989 | Pohl et al. | 360/103 |
| 4,996,113 | 2/1991 | Hector et al. | 219/121.67 |
| 5,012,369 | 4/1991 | Owe et al. | 360/104 |
| 5,228,324 | 7/1993 | Frackiewicz et al. | 72/342.1 |
| 5,256,850 | 10/1993 | Maegawa et al. | 219/121.85 |
| 5,297,413 | 3/1994 | Schones et al. | 72/342.1 |
| 5,303,108 | 4/1994 | Higashionji et al. | 360/107 |
| 5,341,256 | 8/1994 | Murata et al. | 360/109 |
| 5,343,543 | 8/1994 | Novak, Jr. et al. | 385/31 |
| 5,347,415 | 9/1994 | Murata et al. | 360/109 |
| 5,514,849 | 5/1996 | Findlan et al. | 219/121.63 |
| 5,537,276 | 7/1996 | Mukae et al. | 360/109 |
| 5,588,200 | 12/1996 | Schudel | 29/603.01 |
| 5,712,463 | 1/1998 | Singh et al. | 219/121.6 |

FOREIGN PATENT DOCUMENTS

| | | |
|---|---|---|
| 60-147982 | 8/1985 | Japan . |
| 60-244495 | 12/1985 | Japan . |
| 1-227279 | 9/1989 | Japan . |
| 3-192586 | 8/1991 | Japan . |
| 4-310614 | 11/1992 | Japan . |
| 5-189906 | 7/1993 | Japan . |
| 9201768 | 6/1993 | Netherlands . |

OTHER PUBLICATIONS

"Automated Fly Height Test and Adjust System," IBM Technical Disclosure Bulletin, vol. 34, No. 10B pp. 242–244 (Mar. 1992).

English abstract of Dutch patent document NL 9201768–A.

*Primary Examiner*—Gregory Mills
*Attorney, Agent, or Firm*—Hopkins & Carley; Donald J. Pagel

[57] ABSTRACT

An apparatus and method for automatically adjusting the gram load and static attitude in a head suspension assembly comprising one or more lasers, a fiber optic switch, a measurement apparatus and a computer control means. The fiber optic switch includes a plurality of fiber optic lines which direct the output of the laser to well-defined regions on the suspensions in a disk drive. Irradiation of the suspension by the laser causes a load change which alters the static attitude change in the slider. In the method of the present invention, the initial gram load or static attitude is measured by the measurement apparatus and the control means calculates how much energy is required to cause the change needed to achieve the desired condition. Other information, such as the type of laser to be used is also specified by the control means. The laser then delivers output to the suspension through the fiber optic line having an angled end and the static attitude or gram load is remeasured to determine if additional adjustment is required.

20 Claims, 5 Drawing Sheets

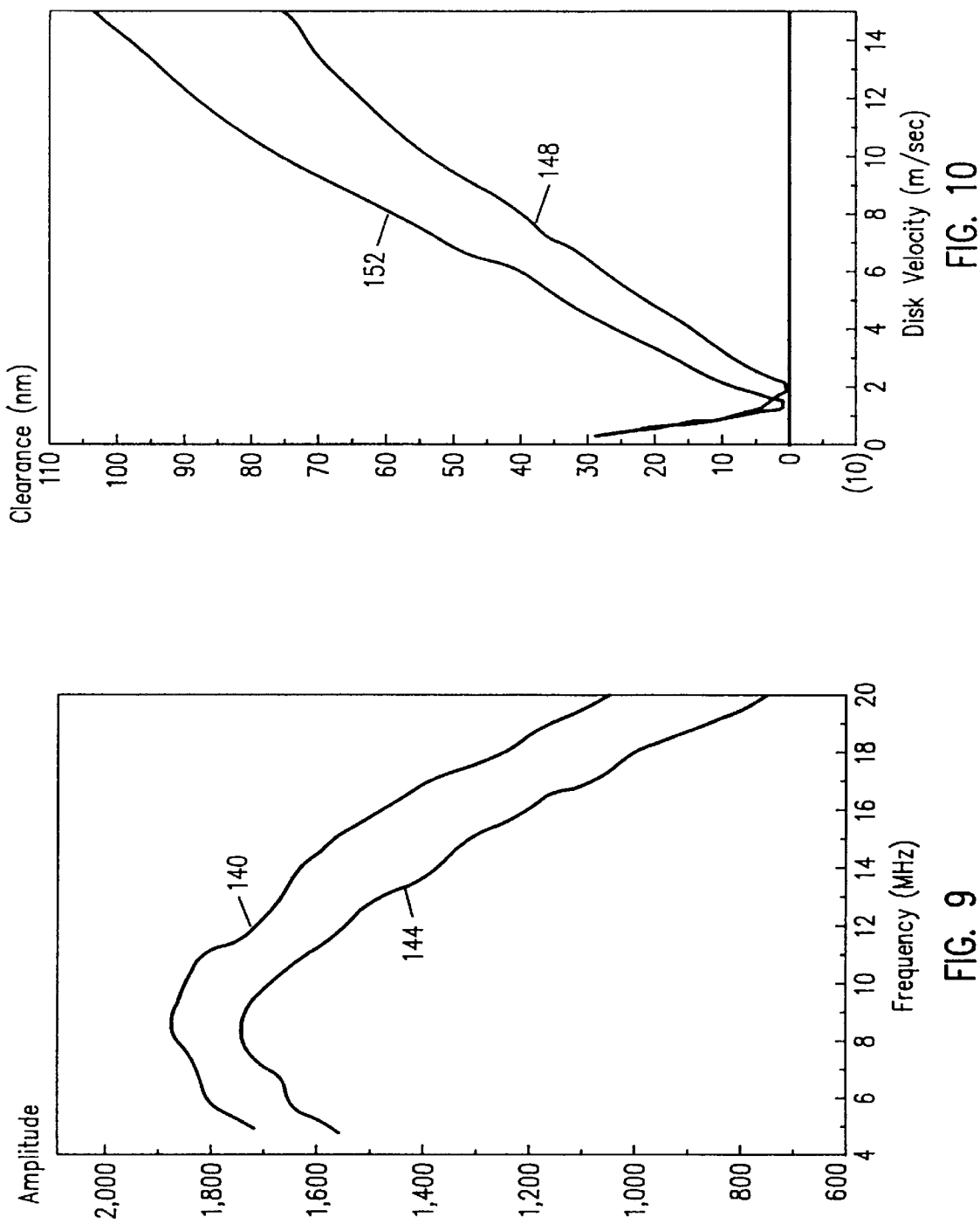

LASER APPARATUS AND METHOD ADJUSTING THE GRAM LOAD, STATIC ATTITUDE AND FLYING HEIGHT IN A HEAD SUSPENSION ASSEMBLY

This is a division of Ser. No. 08/531,214, filed Sep. 19, 1995 now U.S. Pat. No. 5,712,463.

TECHNICAL FIELD

The present invention relates to an apparatus and method for adjusting the gram load and static attitude of a slider in the head suspension assembly of a magnetic hard disk drive and more particularly to an apparatus and method that utilize a laser to heat one or more small regions of the suspension.

BACKGROUND ART

Magnetic recording hard disk drives that utilize a transducer mounted on a slider for reading and/or writing data on at least one rotatable magnetic disk are well-known in the art. In such systems, the slider is typically attached to an actuator arm by a suspension system and the slider is positioned very close to the disk surface. The combination of the slider and suspension system is referred to as a head suspension assembly.

The separation between the slider and the disk surface is referred to as the flying height. In a conventional disk drive, the slider rides on a cushion of air generated by the rotation of the disk and the flying height is influenced by factors such as the rotation of the disk, the aerodynamic shape and attitude of the slider and the load applied to the slider by the suspension.

As the storage density of magnetic disks increases, it is necessary to decrease the flying height below the heights conventionally used. For example, in disks with storage densities of 1 to 2 $GB/in^2$, the required flying height is in the range of 35 to 50 nm.

In manufacturing head suspension assemblies, the current industry practice is to adjust the load of the suspension to a predetermined value before the slider is attached. The suspensions are preformed so that they have a higher load than is desired for operation in the disk drive. The suspensions are then positioned on a load measuring cell and heated with focused light from an infrared lamp for a few seconds. The duration of the heating is controlled so that the load after relaxation reaches the desired value. In the process the entire suspension gets heated to several hundred degrees Celsius. Because of this heating, the slider cannot be mounted on the suspension before the load adjustment process, and the process cannot be used with an assembled disk file. Additionally, the process only provides a method for decreasing the load.

Two other parameters associated with the slider are the roll and pitch static attitudes. The roll and pitch static attitudes are dependent on the components of the suspension and on the flatness of the slider, as well as on the suspension assembly processes. These factors also affect the flying height of the slider. Some manufacturers mechanically adjust the roll and pitch static attitude after assembly by bending a suspension component such as the flexure.

Other methods are known for adjusting the flying height of the slider. For example, Pohl et al., in U.S. Pat. No. 4,853,810, disclose the use of a tunnel current electrode for adjusting the flying height. Owe et al., in U.S. Pat. No. 5,012,369, disclose the use of a suspension having a screw for adjusting the flying height. IBM Technical Disclosure Bulletin, vol. 34, no. 10B, p. 242–244 (March 1992), discloses an automated fly height tester that utilizes a robot to position the head suspension assembly on a quartz disk where the load is adjusted mechanically or with an infrared gram load adjustment system.

SUMMARY OF THE PRESENT INVENTION

Briefly, the preferred embodiment of the present invention is an apparatus that heats a very small region of the load beam and/or the flexure of the suspension. This heating causes a deformation in the suspension which changes a suspension parameter such as the gram load of the suspension, the pitch static attitude, the roll static attitude and/or the flying height of the slider.

The apparatus comprises a continuous wave laser such as a diode laser, a pulsed laser such as an Nd:YAG laser, a fiber optic switch, an automated control means such as a desktop computer and a measurement apparatus for measuring one or more of the suspension parameters (e.g. the gram load, the static attitude and/or the flying height). The fiber optic switch includes a plurality of fiber optic lines which are used to direct the output of the lasers to a well-defined region on the suspension. Since only a localized region of the suspension is heated, the apparatus can be used after the sliders and associated wiring have been mounted on the suspension without damaging the slider.

The fiber optic switch is capable of switching the laser output from one fiber optic line to another fiber optic line. Because there are a plurality of fiber optic lines, a plurality of suspensions can be adjusted with a single apparatus, or multiple suspension parameters can be adjusted on one suspension.

In the method of the present invention for adjusting one or more of the suspension parameters, the apparatus measures the initial value of the suspension parameter. The control means calculates the type (pulsed or continuous wave), amount and spatial location of laser irradiation required to cause the desired change in the relevant parameter value. The laser then delivers radiation to the suspension through the fiber optic switch. Irradiation of the suspension with the laser output heats a small region of the suspension and causes the desired change. The apparatus then remeasures the resultant parameter to determine if additional adjustment is required.

The control means controls the laser output and receives feedback information from the apparatus. Reference data stored in the control means allows calculations to be made concerning the change required to yield a desired parameter value and the type (pulsed or continuous wave), amount and spatial location of irradiation required to cause the desired change.

BRIEF DESCRIPTION OF THE DRAWINGS

FIG. 9 is a graphical representation of a magnetic rolloff curve;

FIG. 10 is a graphical representation of a clearance curve;

DETAILED DESCRIPTION OF THE PREFERRED EMBODIMENT

Figure 1:
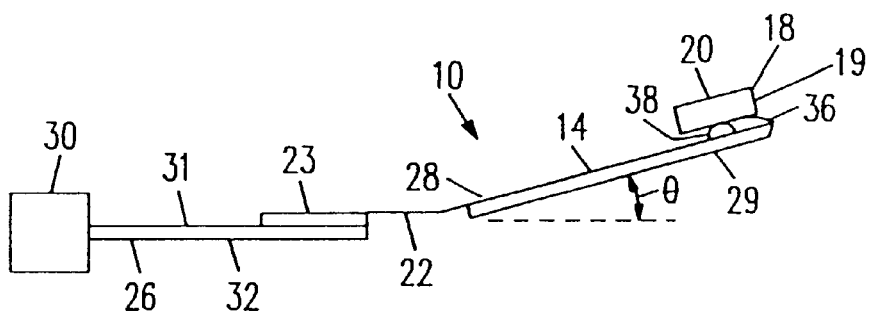
FIG. 1 is a side view of a head suspension assembly in the unloaded state according to the prior art.

FIG. 1 illustrates a head suspension assembly 10 (referred to as the HSA 10 or the suspension 10) comprised of a load beam 14 and a slider 18. The slider 18 includes a front surface 19 and an air bearing surface 20 (ABS 20). The load beam 14 includes a hinge region 22 which is connected by a connector 23 to an actuator arm 26. The load beam 14 is bent at an angle θ relative to the hinge region 22. The load beam 14 has a top side 28 and a bottom side 29. The top side 28 is the side of the load beam 14 on which the slider 18 is mounted, and the bottom side 29 is the side of the load beam 14 opposite to the top side 28.

The actuator arm 26 is connected to an actuator 30 which functions to move the slider 18 relative to the surface of a hard magnetic disk 34 (shown in FIG. 2) or other magnetic storage medium. The actuator arm 26 has a top surface 31 that faces in the same direction as the top side 28, and a bottom surface 32 that faces in the same direction as the bottom side 29. The load beam 14 is attached to the actuator arm 26 along the surface 31 by the connector (base plate) 23. The slider 18 includes one or more data transducers for reading and/or writing data on the magnetic disk 34. The slider 18 is attached to the load beam 14 by a flexure 36 and a dimple 38. As is well known in the art, a second suspension (see FIG. 11) is typically attached to the bottom surface 32 of the actuator arm 26. The second suspension is identical to the suspension 10 but faces in the opposite direction.

Figure 2:
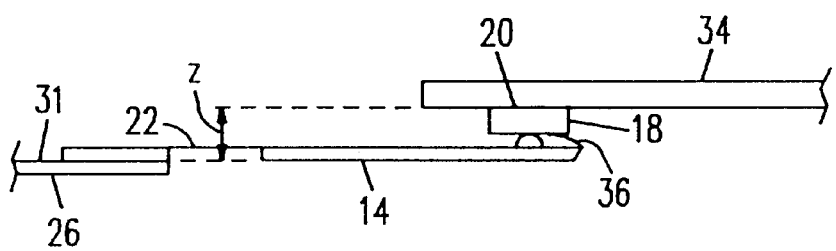
FIG. 2 is a side view of a head suspension assembly in the loaded state according to the prior art.

FIG. 2 illustrates the relationship of the HSA 10 to the disk 34 when the disk 34 is not rotating. In the configuration shown in FIG. 2, the HSA 10 is said to be in the "loaded" state. In the loaded state, the load beam 14 and the flexure 36 are bent down by the disk 34 so that the angle θ between the load beam 14 and the hinge region 22, is close to zero. Because the hinge region 22 resists this deformation, a force (also called the gram load) is transmitted through the load beam 14 and dimple 38 to the slider 18. The distance between the ABS 20 of the slider 18 and the top surface 31 of the arm 26 is called the z height. In cases where the slider 18 is not present, the distance between the surface 31 and the top of the flexure 36 is called the z height.

Figure 3:
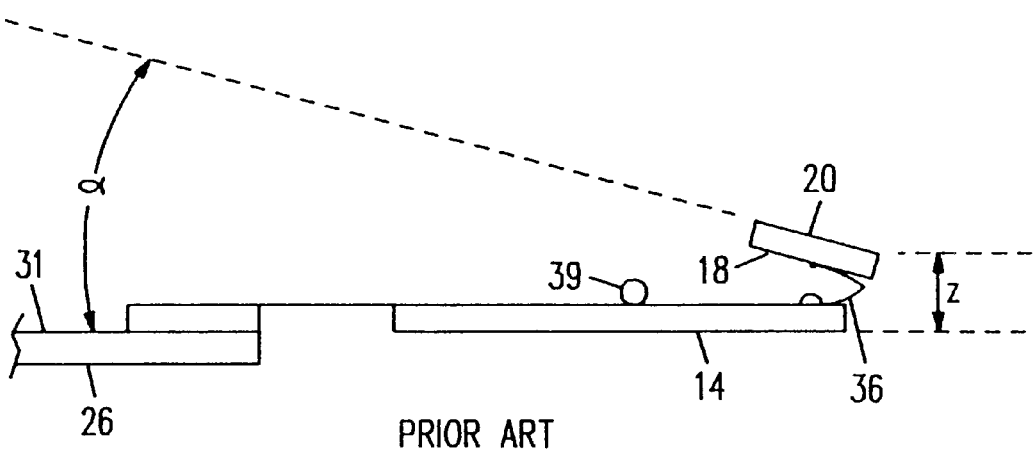
FIG. 3 is a side view of a head suspension assembly according to the prior art.

FIG. 3 illustrates the load beam 14 held in the loaded state by an external means such as a pin 39. In this configuration, an angle α is defined by the ABS 20 and the top surface 31. The angle α is referred to as the pitch static attitude (PSA) of the slider 18.

Figure 4:
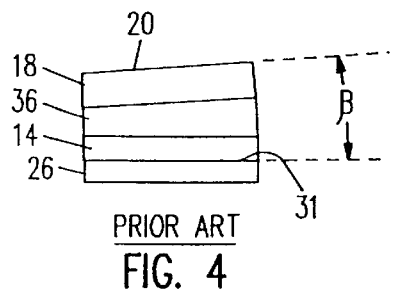
FIG. 4 is an end view of the head suspension assembly shown in FIG. 3.

FIG. 4 is an end view of the HSA 10 with the load beam 14 held in the loaded state as was described in FIG. 3. An angle β is defined by the horizontal tilt of the ABS 20 relative to the top surface 31 as is illustrated in FIG. 4. The angle β is referred to as the roll static attitude (RSA) of the slider 18. The term "static attitude" is used to describe either the PSA or the RSA, or both parameters together. The definitions for the angles α and β used in FIGS. 3 and 4 assume that the slider 18 has its read/write elements positioned on the front surface 19. However, similar definitions apply if the read/write elements are positioned on the side of the slider 18.

Figure 5:
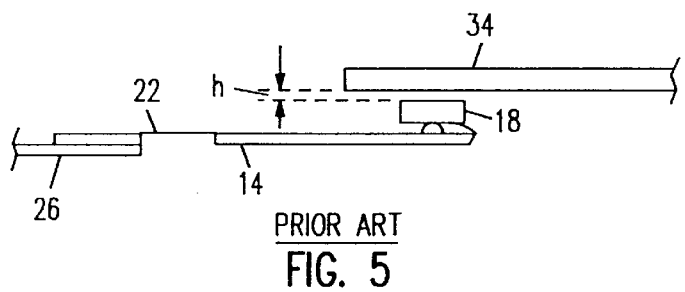
FIG. 5 is a side view of a head suspension assembly illustrating the flying height of the slider.

FIG. 5 illustrates the relationship of the HSA 10 to the disk 34 when the disk 34 is rotating. The rotation of the disk 34 causes the slider 18 to be positioned a distance "h" from the surface of the disk 34. The distance "h" is referred to as the slider "flying height" and represents the position that the slider 18 occupies when the disk 34 is rotating during normal operation of a disk file. If the flying height "h" is not maintained within a certain range, the quality of the data read from the disk 34 (or written on the disk 34) degrades.

Several factors contribute to the flying height "h." For example, when the disk 34 is rotating, the rotation of the disk 34 creates a force (called an air bearing) that pushes the slider 18 away from the disk 34. The load transmitted by the load beam 14 and the torque exerted by the flexure 36 oppose the air bearing force. Therefore, adjustments to the angles θ, α and β contribute to the final value of the flying height "h." Typically, the angle θ is set at some predetermined value during the manufacturing process and provides the coarse positioning of the slider 18 which allows the height h to be maintained when the disk 34 is rotating.

Figure 6:
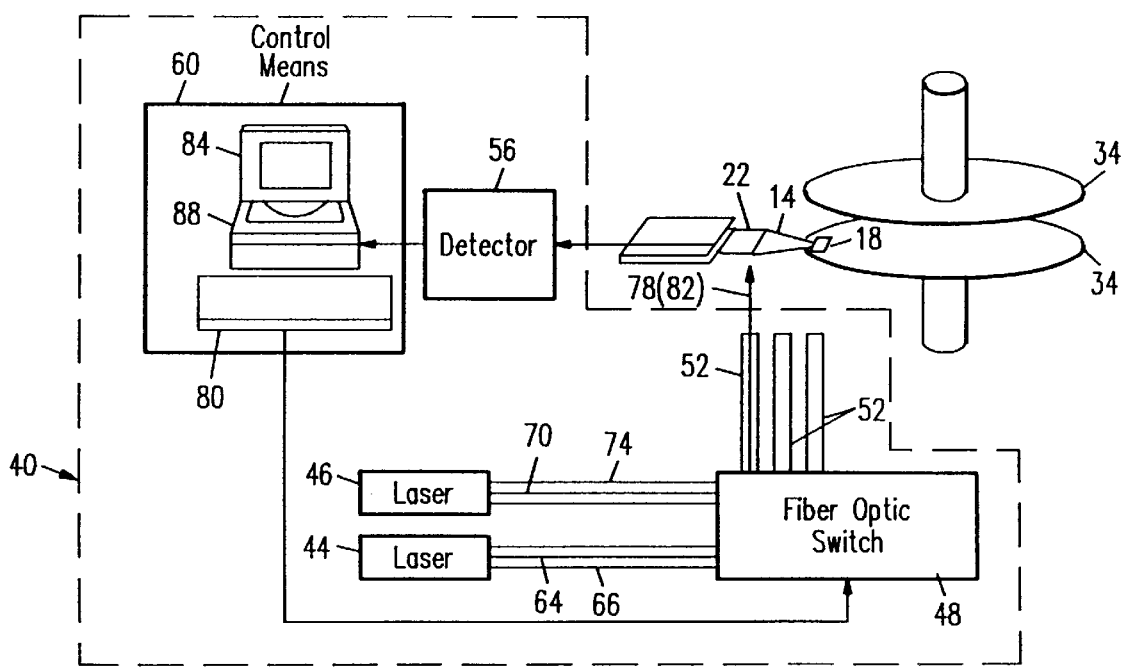
FIG. 6 is a schematic diagram of an automated head adjustment apparatus according to the present invention.

FIG. 6 illustrates a suspension adjustment apparatus 40 which is used to adjust the gram load (angle θ) in the HSA 10. The apparatus 40 is also used to adjust the pitch and roll static attitudes of the HSA 10. The apparatus 40 comprises a pulsed laser 44, a continuous wave laser 46, a fiber optic switch 48, a plurality of fiber optic output lines 52, a detector 56 and a control means 60. In the preferred embodiment, the pulsed laser 44 comprises either a 532 nm Q-switched frequency doubled Nd:YAG laser (Neodymium:Ytterbium-Aluminum-Garnite laser), or a 1064 nm Q-switched Nd:YAG laser. The CW laser 46 comprises a diode array laser such as a Spectra Diode laser. However, other types of pulsed lasers and continuous wave lasers could be used as the lasers 44 and 46, respectively.

A desired characteristic of the pulsed laser 44 is the ability to deliver high energy radiation in short pulses (i.e. 5–50 nanoseconds) and the Q-switched function provides this characteristic. In other cases, longer pulses (up to one second) have been seen to work. Also, it has been determined that higher frequency laser radiation is absorbed more efficiently by the stainless steel suspension. A desired characteristic of the CW laser 46 is the ability to deliver in the wavelength range of 500 to 1100 nm and giving 3–15 watts of power.

The pulsed laser 44 generates a laser beam 64 which is inputted into the fiber optic switch 48, generally through a fiber optic line 66. Similarly, the CW laser 46 generates a laser beam 70 which is inputted into the fiber optic switch 48, generally through a fiber optic line 74. In general, the CW laser 46 is used only when it is desired to decrease the load and hence increase the flying height. The pulsed laser 44 is used when it is desired to increase the load and decrease the flying height. The pulsed laser 44 is also used for changing the RSA and PSA of the slider 18. As is explained later, the pulsed laser can also be used to decrease the load of the HSA 10 by irradiating the bottom side 29 of load beam 14.

The fiber optic switch 48 is a device, known as a 2×N switch, that allows either of the two laser beams 64 and 70 to be routed to any of the fiber optic output lines 52 and switched from one of the fiber optic output lines 52 to another fiber optic output line 52. The laser beam 64 is outputted from one of the fiber optic output lines 52 as an output laser beam 78 and the laser beam 70 is outputted from one of the fiber optic output lines 52 as an output laser beam 82.

One of the fiber optic output lines 52 is positioned to deliver either the output laser beam 78 or the output laser beam 82, to the hinge region 22 of the load beam 14, and/or to the flexure 36 or to a region near the end of the load beam 14 that contains the dimple 38. The lines 52 are mounted on a translation mechanism that moves an individual fiber 52 so that a plurality of points on the area of the hinge region 22 can be subjected to the laser output (see FIG. 7).

Each fiber optic output line 52 is positioned to deliver laser output to a single HSA 10. Preferably, each fiber optic output line 52 is positioned so that the laser output will strike the hinge region 22 or the flexure 36 at a ninety degree angle. In a disk file with multiple head suspension assemblies, the plurality of fiber optic output lines 52 are each directed at a separate HSA 10 (see FIG. 9). In alternative embodiments, the fiber optic output lines 52 and/or the switch 48 could be eliminated, and the hinge region 22 or the flexure 36 could be irradiated directly with the laser beams 64 or 70. In another alternative embodiment, the laser beams 64 or 70 can be directed to a region of the suspension 10 using mirrors or other reflective devices. In general, any device used for routing the laser beams 64 or 70 to the suspension 10, such as the fiber optic output lines 52, mirrors or other reflective devices, is referred to as an "optical means."

The detector 56 is a device for measuring the specific suspension parameter being tested for. The detector 56 changes depending on whether the parameter being adjusted by the apparatus 40 is the flying height "h," the gram load "gl," or the pitch or roll static attitude of the slider (PSA and RSA).

In the preferred embodiment for measuring the flying height "h," the detector 56 comprises a harmonic ratio flying height detector. A harmonic ratio flying height (HRF) detector is a device that measures the flying height "h" by writing a signal on the disk 34 having a read back spectrum that is constant along the track and which has nonzero amplitude for at least two different frequencies. The use of HRF detectors is described by Brown et al. in U.S. Pat. No. 4,777,544 (issued Oct. 11, 1988). In general, flying height detectors of any type can be used as the detector 56, and other specific types of flying height detectors that can function as the detector 56 include white light optical interference detectors, quantitative read back signal detectors and the other detectors described in U.S. Pat. No. 4,777,544.

When the apparatus 40 is used to adjust the gram load of the suspension 14, the detector 56 comprises a load cell of the type which are well known in the art for measuring gram load. When the apparatus 40 is used to adjust the RSA or PSA of the suspension 14, the detector 56 comprises a device for measuring the RSA or PSA. As is well known in the art, devices of this type comprise a single wavelength laser (e.g. a helium-neon laser) which is positioned to illuminate the slider 18 or the flexure 36, and project a pattern of reflected light onto a detector, such as a chart, a diode array or a charge coupled device. The pattern of reflected light is then compared to a standard pattern to yield the RSA or PSA. Generally, whenever the gram load, PSA or RSA are being measured, the slider is held in place at the flying height (z distance) by use of an external means such as the pin 39 shown in FIG. 3.

The control means 60 comprises a device for processing information from the detector 56 and controlling the laser 44. In the preferred embodiment the control means comprises a desktop computer having a keyboard 80 for entering commands, a monitor 84 for displaying system information, and a computer 88 which includes a microprocessor controlled motherboard, a hard disk drive and a floppy disk drive. The control means 60 also includes software running on the computer 88 for performing the calculations described below, including processing the output data from the detector 56 and calculating the quantity of radiation from the lasers 44 and 46 required to adjust the suspension by a desired amount.

Figure 7:
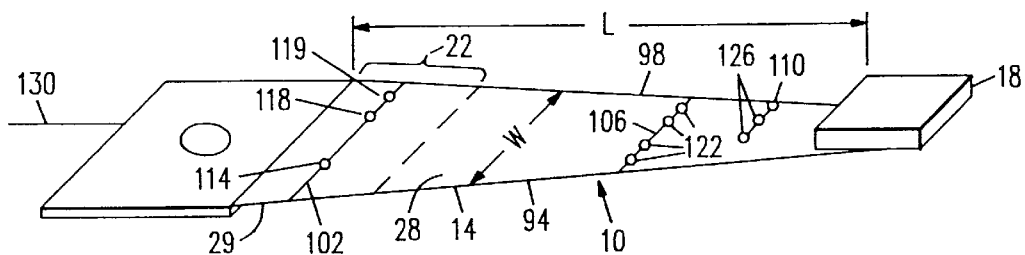
FIG. 7 is a schematic diagram of a head suspension assembly.

FIG. 7 shows that the load beam 14 has a length L and a width W. The length L extends longitudinally in the direction from the actuator arm 26 to the end of the load beam 14 on which the slider 18 is mounted. The width W is the dimension oriented perpendicular to the length L and extending across a pair of sides 94 and 98 of the load beam 14. A line 102 extends across the width W in the hinge region 26 and represents a first irradiation region on the top side 28 of the load beam 14. A line 106 extends across the width W outside of the hinge region 22 and represents a second irradiation region on the top side 28. A line 110 extends across approximately half of the width W outside of the hinge region 22 and represents a third irradiation region on the top side 28.

In a typical flying height adjustment procedure, the fiber optic line 52 (shown in FIG. 6) is positioned to irradiate a first area 114 positioned on the line 102. The translation mechanism in the fiber optic switch 48 allows positioning of the fiber optic line 52 to irradiate the first area 114. After the first area 114 has been irradiated, the translation mechanism in the fiber optic switch 48 is used to reposition the fiber optic line 52 so that a second area 118 and a third area 119, also positioned on the line 102, are irradiated. Generally, a plurality of areas on the line 102 are irradiated.

Similarly, the fiber optic line 52 can be repositioned, for example by using a translation mechanism, so that a plurality of areas 122, positioned on the line 106, or a plurality of areas 126, positioned on the line 110, can be irradiated.

The lines 102, 106 and 110 represent regions or areas of the load beam 14 that can be subjected to irradiation by the lasers 44 or 46. Other regions, besides the lines 102, 106 and 110, can also be irradiated. It has been determined that irradiation of different regions of the load beam 14 effects the load beam 14 differently. For example, irradiation with the pulsed laser 44 in the hinge region 22, on the top side 28 of the load beam 14, results in an increase in the angle θ. Therefore, irradiation with the laser 44 along the line 102, for example in the areas 114 or 118, would result in an increase in the angle θ. In contrast, irradiation with the pulsed laser 44 in the hinge region 22 on the bottom side 29 of the load beam 14, results in a decrease in the angle θ.

The ability to increase or decrease the angle θ by irradiating the hinge region 22 with a laser provides a mechanism for adjusting the gram load and the flying height h of the slider 18. The flying height of an air bearing slider depends very sensitively on the gram load. In the head suspension assembly 10, the gram load can be changed by changing the angle θ. Therefore, changing the angle θ will change the flying height h.

The mechanism for the angle change is thought to be as follows: If a small area (approximately 0.01 to 1 mm$^2$) of the hinge 26 is heated with a high intensity laser pulse having a duration of several nanoseconds, the surface metal layer in the irradiated zone melts and resolidifies quickly. This produces strain in the hinge region 22 which causes the angle θ to either increase or decrease, thereby increasing or decreasing the gram load transmitted to the slider 18 by the load beam 14. The load change on the slider 18 causes the flying height h to change. Thus, the technique of the present invention is to use the laser 44 or 46 to bend the suspension 10 slightly, thereby changing the angle θ.

The flying height h can be either increased or decreased depending on which side of the hinge 22 is irradiated. Irradiating the top side 28 with the pulsed laser 44 increases the gram load on the suspension 10, thereby increasing the angle θ and causing the flying height h to decrease. Conversely, irradiating the bottom side 29 with the pulsed laser 44 decreases the gram load on the suspension 10, thereby decreasing the angle θ and causing the flying height h to increase. However, in many situations, irradiating the suspension 10 from two sides in order to achieve a desired flying height is not practical because positioning two of the fiber optic lines 52 to irradiate two sides of the suspension 10 is difficult.

An alternative solution involves utilizing the CW laser 46. It has been determined that irradiating either the top side 28 or the bottom side 29 with the CW laser 46 decreases the gram load on the suspension 10 thereby decreasing the angle θ and causing the flying height h to increase. Therefore, the flying height h can be increased or decreased by irradiating one side of the suspension 10 (e.g. the top side 28) with different types of laser. Using the pulsed laser 44 will decrease the flying height h and using the CW laser 46 will increase the flying height h. It is thought that irradiating the top side 28 with the CW laser 46 increases the flying height h because the CW laser 46 heats the area 114 to a sufficient depth so that the gram load decreases rather than increases. In contrast, heating from the pulsed laser 44 is mainly a surface phenomenon. The following example illustrates the flying height adjustment technique of the present invention.

EXAMPLE 1

Figure 8:
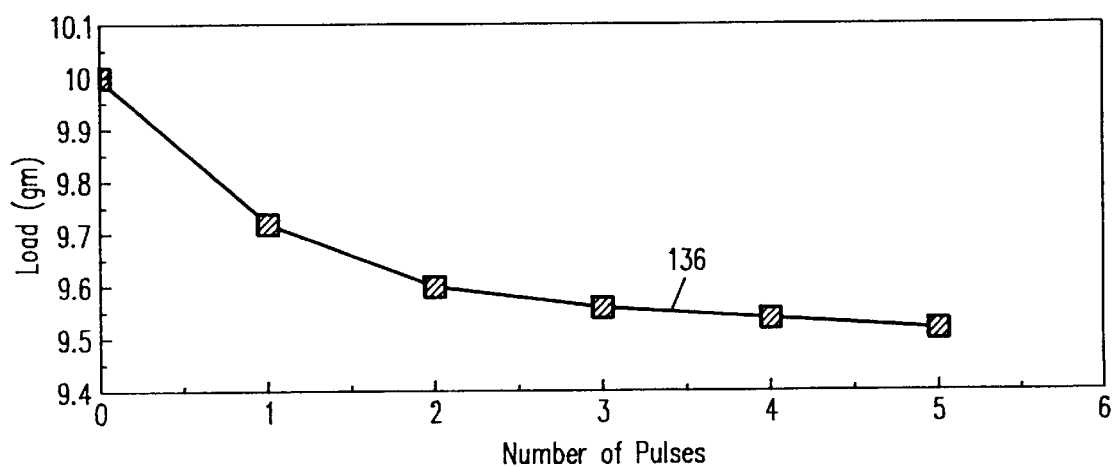
FIG. 8 is a graphical representation showing the variation in load with the number of laser pulses delivered to the suspension.

An experiment was conducted on a single suspension, such as the suspension 14, using a suspension adjustment apparatus similar to the apparatus 40 shown in FIG. 6. The suspension adjustment apparatus used in Example 1 included only the pulsed laser 44 and the suspension was comprised of stainless steel. The 532 nm second harmonic of an Nd:YAG laser was used to irradiate a spot size of 1 mm$^2$ on the bottom side of the suspension in the hinge region 22. A pulse time of 6 nsec was used and energy values ranged from 10 mJ/pulse to 100 mJ/pulse. FIG. 8 illustrates the relationship between the number of laser pulses used in Example 1 and the resulting load change. A line 136 indicates that multiple pulses can be used to decrease the load from ten grams to approximately 9.5 grams. The multiple pulses illustrated in FIG. 8 were delivered to a single area in the hinge region 22 corresponding to the area 114 in FIG. 7. Similar results are obtained when the multiple pulses are delivered to a plurality of areas, such as the areas 118 and 119 shown in FIG. 7.

With respect to Example 1, it was observed that in order to cause a load change, the intensity of the radiation must exceed a certain threshold value. In Example 1, when the energy per pulse was greater than 10 mJ, well-defined changes in the suspension load occurred without any damage to the surface of the suspension 14.

This threshold energy requirement is consistent with a mechanism in which the load change is attributed to the melting and resolidifying of a small "local" area, or at least to the increase of stress in the local area. This local melting/stress creation hypothesis is supported by the fact that the threshold energy is approximately equal to the energy that would be required to melt a stainless steel layer having a thickness of 0.7 μm (i.e. the thickness over which the energy spreads during the 6 nsec laser pulse).

Several other important observations were made in connection with Example 1. First, for a given energy per pulse, 532 nm is more efficient than 1064 nm radiation for causing a load change. This is consistent with the fact that the reflectivity of metals increases with wavelength.

Second, to cause a load change it is not necessary to have the slider 18 loaded against a surface. This means that the flying height can be adjusted while the head suspension assembly 10 is assembled.

Third, the sign of the load change reverses when the opposite side of the hinge 22 is irradiated. This means that the flying height h can be increased or decreased. Additionally, by utilizing the CW laser 46 in conjunction with the pulsed laser 44, as is illustrated in FIG. 6, the flying height h can be increased or decreased from the same side of the of the hinge 22. As was explained previously, irradiating the top side 28 of the hinge region 22 with the pulsed laser 44 causes the flying height to decrease whereas irradiating the top side 28 with the CW laser 46 causes the flying height to increase.

Fourth, since the heat is applied locally for a short duration of time, the increase in temperature of the entire head suspension assembly 10 is only 1–2° C. This means that the flying height h can be adjusted while the head suspension assembly 10 is assembled in the disk file without damaging the slider 18 or the magnetic read/write transducers.

The ability to adjust the flying height after the disk file is assembled means that the flying height h can be more accurately adjusted because the head suspension assembly 10 is in its actual operating environment. This feature means that effects such as stacking tolerances and load alterations during arm assembly can be compensated for with the present invention.

The steps involved in the preferred method of the present invention for adjusting the flying height of a single suspension (such as the suspension 14) are summarized as follows:

1. Measure the flying height h of the slider 18 using the detector 56.

2. Calculate the load change (increase or decrease) required to change the flying height h to the desired value. In the preferred embodiment this is accomplished by using a first "look up" table stored in the control means 60. The first look up table is derived from calibration data in which flying height is plotted against increasing suspension load.

3. Calculate the amount of energy (e.g. in joules) required to obtain the load change calculated in step 2. In the preferred embodiment this is accomplished by using a second "look up" table stored in the control means 60. The second look up table is derived from empirical calibration data, such as the number and intensity of laser pulses, or the power and duration of the pulses, required to bring about various load changes on similar suspensions.

4. Use the pulsed laser 44 to deliver the energy calculated in step 3 to the suspension 14. In the preferred embodiment this is accomplished by delivering the required number of pulses to a plurality of areas along the line 102 in the hinge region 22.

5. Remeasure the flying height h of the slider 18 using the detector 56. Typically, it is assumed in steps 2 and 3 that a load increase will be needed. Therefore, the pulsed laser 44, directed at the top side 28, is used to cause load increase. If a load decrease is needed, then the CW laser 46, directed at the top side 28, is used. Alternatively, the pulsed laser 44 can be directed at the bottom side 29 to cause a load decrease. Another less desirable alternative is to use very long pulses from the pulsed laser, directed at the top side 28, to cause a load decrease.

In an alternative procedure, after step 2 above, the amount of energy required to cause the load change is obtained from a second look up table. The second look up table also specifies whether pulsed or CW laser should be used (referred to as the "type" of radiation) and sets the location on the suspension that should be irradiated (i.e. the location of the line 102 and the positions of the areas 114, 118 and 119). Furthermore, in certain situations, it may be preferable to use only the pulsed laser 44 or to use only the CW laser 46.

A similar method is used to adjust the gram load of the suspension 10. For example, the gram load may need to be adjusted before the slider 18 is attached to the suspension 10. The steps involved in adjusting the gram load are as follows:

1. Measure the gram load of the suspension 10 using the detector 56;

2. Use the pulsed laser 44 or the CW laser 46 to irradiate a region of the suspension 10, such as along the line 102 in the hinge region 22; and 3. Remeasure the gram load of the suspension 10 using the detector 56.

In variations of this method, steps 1 or 2 could be omitted and/or after step 1, the control means 60 can be used to calculate the amount, type or location of the radiation needed to cause the desired load change.

FIG. 9 illustrates a pair of "rolloff" curves generated by a suspension, such as the suspension 10, before and after the suspension 10 has been irradiated by a continuous wave (CW) laser such as the laser 46. A "rolloff" curve is a plot of the amplitude of the magnetic readback signal versus the frequency of the written signal. Rolloff curves are used to determine the magnetic read/write performance of the interface. The line 140 illustrates the performance of the slider 18 before the suspension 10 is irradiated by the CW laser 46 and shows a head resolution of 0.553 (head resolution=signal amplitude at 20 MHz/signal amplitude at 10 MHz). The line 144 illustrates the performance of the slider 18 after the suspension 10 is irradiated at the areas 114 or 118 (see FIG. 7) by the CW laser 46 and shows a resolution of 0.431. Comparison of the lines 140 and 144 shows that the resolution of the slider has decreased which is consistent with a higher flying height.

FIG. 10 illustrates a pair of "QRS Clearance" curves generated by a suspension, such as the suspension 10, before and after the suspension 10 has been irradiated by a continuous wave (CW) laser such as the laser 46. A "QRS Clearance" curve is a plot of the clearance (i.e. the flying height h) of the slider 18 versus the velocity at which the disk is rotating. The line 148 illustrates the performance of the slider 18 before the suspension 10 is irradiated by the CW laser 46. The line 152 illustrates the performance of the slider 18 after the suspension 10 is irradiated at the areas 114 or 118 (see FIG. 7) by the CW laser 46. Comparison of the lines 148 and 152 shows that at all velocities, the flying height of the slider 18 has increased. Furthermore, if the suspension that was used to generate line 152 is subsequently irradiated with the pulsed laser 44 on the same side of the suspension (i.e. on the top side 28), the flying height h decreases back towards its original value.

Figure 11:
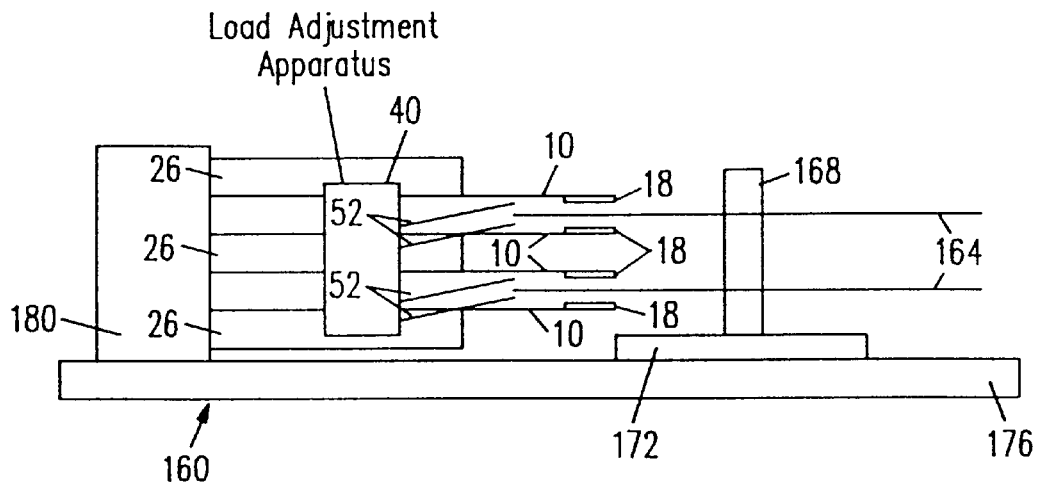
FIG. 11 is a side view of the suspension adjustment apparatus for use with a disk file.

FIG. 11 illustrates the use of the suspension adjustment apparatus 40 to adjust a plurality of suspensions 10 in an assembled disk file 160. The process used in adjusting the flying height of the plurality of suspensions 10 utilizes the same steps 1–5 listed above for a single suspension. After a first suspension 10 is adjusted using steps 1–5 above, the fiber optic switch 48 shifts the output of the laser 44 (or 46) to a second fiber optic line 52 directed at a second suspension 10 and the steps 1–5 are repeated for the second suspension 10. The process is repeated for "n" number of suspensions 10. Alternatively, a single fiber optic line 52 could be utilized, and this line 52 would be repositioned over each of the "n" suspensions 10 before an individual suspension was adjusted.

In another variation of this technique, one fiber optic line 52 is directed to the top side of the suspension 10, and a second fiber optic line 52 is directed to the bottom side of the same suspension 10. The first and second fiber optic lines 52 are then used to supply laser radiation to the top and bottom sides of the same suspension 10. This pair of fiber optic lines can then be repositioned over each of the "n" suspensions 10.

The disk file 160 comprises a plurality of magnetic recording disks 164 suitable for use in hard disk drives. The disks 164 are mounted on a spindle shaft 168 which is connected to a spindle motor 172. Motor 172 is mounted to a chassis 176.

A plurality of the suspensions 10 are positioned over the disks 164 such that each disk 164 can be accessed by one of the sliders 18. Each suspension 14 is attached to an actuator arm 26 which is attached to a rotary actuator 180. The rotary actuator 180 moves the actuator arm 26 (and hence the suspension 14) in a radial direction across the disk 164.

The adjustment of the flying height is preferably conducted after the merge operation of the sliders 18 with the disks 164 because this allows the flying height to be corrected for the effects of disk curvature, stacking tolerances and load alteration during arm assembly.

When the flying height is adjusted after the disk file 160 has been assembled, one of the fiber optic output lines 52 is directed at the hinge region 22 of each suspension 10. Again, it is preferable that each fiber optic output line 52 be positioned so that the laser radiation will strike the hinge region 22 at an approximately ninety degree angle. Due to spatial considerations, optical access to the hinge region 22 is more convenient from the side of the hinge region 22 that faces the disk 164 accessed by the suspension 10 (i.e. from the top side 28 as is illustrated in FIG. 7). Generally, the apparatus 40 is positioned off to the side of the suspensions 10 and the fiber optic output lines 52 lie in planes that run parallel to the planes of the disks 164. The ends of the fiber optic output lines 52 are configured as is illustrated in FIG. 13 in order to deliver the laser output to the hinge region 22 at an approximately ninety degree angle.

Figure 12:
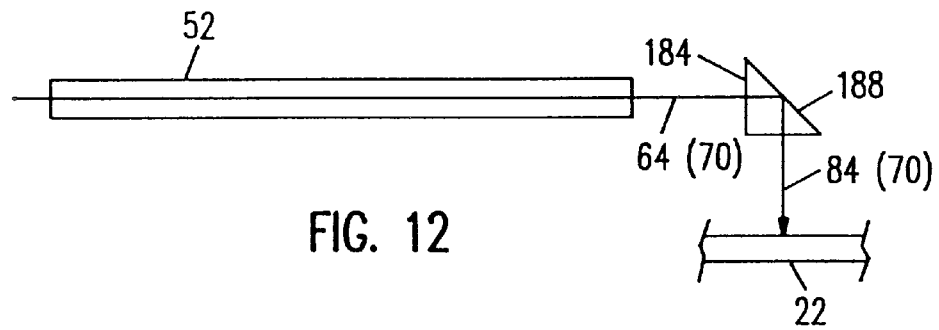
FIG. 12 is a side view of a fiber optic line being used with a prism.

FIG. 12 illustrates the use of an external prism 184 to direct the laser beam 64 (or 70) to the hinge region 22. The laser beam 64 is reflected off a surface 188 so that it strikes the hinge region 22 at a ninety degree angle. The use of the prism 184 would facilitate directing the laser beam 64 to the hinge region 22 in situations where it is difficult to correctly position the fiber optic line 52. Other optical devices such as mirrors could also be used to bend the path of the laser beam 64 and/or facilitate optical access to the hinge region 22.

Figure 13:
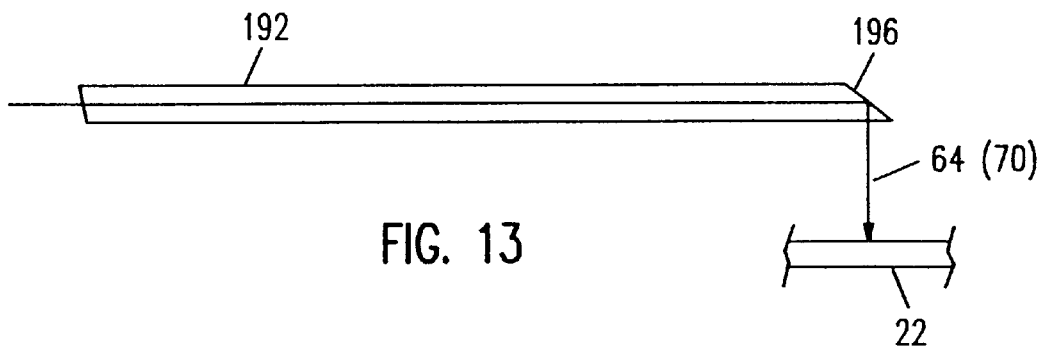
FIG. 13 is a side view of a fiber optic line terminated in an angled surface.

FIG. 13 illustrates a fiber optic output line 192 having its end terminated with an angled surface 196 for directing the laser beam 64 (or 70) nearly normal to the hinge region 22. As discussed previously, the fiber optic line 192 may be substituted for one or more of the lines 52.

Referring again to FIG. 7, a procedure for adjusting the roll static attitude (RSA) and the pitch static attitude (PSA) of the load beam 14 can be described. It has been determined that irradiation of the load beam 14 with the lasers 44 or 46 will change the angles α and β (shown in FIGS. 3 and 4). Specifically, irradiation of the load beam 14 at single or multiple sites across the width W, for example along the line 106, bends the load beam slightly in a manner that changes the angle α. Hence, this causes a change in the PSA of the load beam 14. Similarly, irradiation of the load beam 14 along only part of the width W, for example along the line 110, bends the load beam slightly in a manner that changes the angle β. Hence, this causes a change in the RSA of the load beam 14.

In general, to cause a change in the PSA of the load beam 14, the line 106 can be positioned anywhere along the load beam 14, including on the flexure 36. However, it is preferable to have the line 106 positioned outside of the hinge area 22 and in the vicinity of the slider 18 because this will decouple PSA changes from changes in the angle θ which affect the gram load. Similarly, to cause a change in the RSA of the load beam 14, it is preferable to have the line 110 positioned outside of the hinge area 22, and in the vicinity of the slider 18, for the same reason.

RSA changes can also be caused when the line 110 is positioned on the flexure 36. Additionally, changes to the RSA and PSA are influenced by which side of the load beam 14 is irradiated. Therefore, irradiating the bottom side 29 causes RSA and PSA changes in one direction and irradiating the top side 28 causes RSA and PSA changes in the opposite direction. In the preferred embodiment, spatial considerations make it preferable to irradiate the top side 28 of the load beam 14. Again, it is preferable that each fiber optic output line 52 be positioned so that the laser radiation will strike the load beam 14 at an approximately ninety degree angle, as was discussed previously with respect to adjustment of the flying height.

A summary of the steps involved in using the apparatus 40 to adjust the PSA is as follows:

1. Measure the PSA of the suspension 10 using a standard technique such as using a single wavelength laser (e.g. a helium-neon laser) which is positioned to illuminate the slider 18 and project a pattern of reflected light onto a detector such as a chart, a diode array or a charge coupled device, and then compare the pattern to a standard;

2. Use the lasers 44 or 46 and the optical fiber 52 to irradiate a first spot on the load beam 14;

3. Use the translation feature of the switch 48 to reposition the optical fiber 52 and irradiate a second spot on the line 106; and 4. Repeat step 3 until a plurality of spots spanning the width W and being positioned along the line 106 have been irradiated.

In this procedure, it should be noted that the PSA will be somewhat affected even if only a single spot is irradiated. The purpose in using a plurality of spots in steps 3 and 4 is to increase the effect.

Similarly, a summary of the steps involved in using the apparatus 40 to adjust the RSA is as follows:

1. Measure the RSA of the suspension 10 using a known technique;

2. Use the lasers 44 or 46 and the optical fiber 52 to irradiate a first spot on the load beam 14;

3. Use the translation feature of the switch 48 to reposition the optical fiber 52 and irradiate a second spot on the line 110; and 4. Repeat step 3 until a plurality of spots spanning approximately half of the width W and being positioned along the line 110 have been irradiated.

In this procedure, it should be noted that the RSA will be somewhat affected even if only a single spot is irradiated. The purpose in using a plurality of spots in steps 3 and 4 is to increase the effect.

It should be noted that the adjustment techniques of the present invention, including the RSA adjustment technique, the PSA adjustment technique, the flying height adjustment technique and the gram load adjustment technique, can be utilized at several points in the manufacturing process. For example, the techniques can be used at the time the slider 18 is attached to the load beam 14, or after the suspension 10 has been attached to the actuator arm 26 or after a plurality of the suspensions 10 have been assembled in the disk file 86 shown in FIG. 11. Additionally, the adjustment techniques of the present invention can be used before the slider is attached to the load beam 14, for example to make a coarse adjustment to one of the parameters (RSA, PSA or gram load). At the present time, the preferred stage for making RSA and/or PSA depends on the type slider being used. For larger sliders (e.g. "50%" sliders, dimensions=2.0 mm by 1.6 mm), the preferred adjustment time is after the slider has been attached to the load beam. For smaller sliders (e.g. "pico" sliders, dimensions=1.25 mm by 1.0 mm), the preferred adjustment time is after the load beam has been attached to the actuator arm.

The mechanism for causing RSA and PSA changes using the method described above is thought to be similar to the mechanism described previously with respect to causing changes in the angle θ. Specifically, when a small area (approximately 100 to 1000 μm) of the load beam 14 is heated with a high intensity laser pulse having a duration of several nanoseconds, the metal in the irradiated zone melts and resolidifies quickly. This produces strain in the small area which causes the load beam to bend slightly along the line 106 or 110, thereby changing the PSA or RSA. Similarly, if the flexure 36 is irradiated, strain is created in the flexure which causes it to bend slightly.

In the preferred embodiment, RSA and PSA adjustments are made using the pulsed laser 44. However, the CW laser 46 can also be used. Generally, irradiation of a region with the CW laser 46 will cause the RSA or PSA to change in the opposite direction as is obtained when the pulsed laser 44 is used to irradiate the same region. Therefore, use of the CW laser 46 in combination with the pulsed laser 44 allows the RSA and/or the PSA to be adjusted in one direction and then readjusted back in the opposite direction.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for bending a suspension comprising:
a first laser for generating a first beam of laser radiation;

an optical fiber coupled optically to the laser for transmitting the first laser beam to a suspension to be bent, the optical fiber having an angled end that redirects the first beam of laser radiation approximately ninety degrees to the longitudinal axis of the optical fiber; and a control device for determining the type of laser radiation required to cause a desired bend in the suspension.

2. The apparatus of claim 1 further comprising a means for measuring the gram load of the suspension.

3. The apparatus of claim 1 further comprising a means for measuring the flying height of a slider attached to the suspension.

4. The apparatus of claim 1 wherein the control device determines that a first type of laser radiation is required to cause the suspension to bend toward the angled end and a second type of laser radiation is required to cause the suspension to bend away from the angled end.

5. The apparatus of claim 4 wherein the first type of laser radiation comprises short pulses of high energy radiation.

6. The apparatus of claim 4 wherein the second type of laser radiation comprises longer pulses than the first type of laser radiation.

7. The apparatus of claim 4 further comprising:

a second laser for providing the second type of laser radiation.

8. The apparatus of claim 7 wherein the second laser comprises a continuous wave laser.

9. The apparatus of claim 1 wherein the optical fiber is positioned to adjust the pitch static attitude of a slider attached to the suspension.

10. The apparatus of claim 1 wherein the optical fiber is positioned to adjust the roll static attitude of a slider attached to the suspension.

11. The apparatus of claim 1 further comprising:

a plurality of suspensions; and repositioning means for moving the optical fiber between at least some of the plurality of suspensions.

12. The apparatus of claim 11 further comprising:

at least one recording disk positioned proximate to at least one of the plurality of suspensions.

13. An apparatus for bending a suspension comprising:

a first laser for generating a first beam of laser radiation;

an optical fiber coupled optically to the laser for transmitting the first laser beam to a suspension to be bent, the optical fiber having an angled end that redirects the first beam of laser radiation approximately ninety degrees to the longitudinal axis of the optical fiber, and a control device for determining the type of laser radiation required to cause a desired bend in the suspension and wherein the control device determines that a first type of laser radiation is required to cause the suspension to bend toward the angled end and a second type of laser radiation is required to cause the suspension to bend away from the angled end.

14. The apparatus of claim 13 wherein the first type of laser radiation comprises short pulses of high energy radiation.

15. The apparatus of claim 13 wherein the second type of laser radiation comprises longer pulses than the first type of laser radiation.

16. The apparatus of claim 13 further comprising:

a second laser for providing the second type of laser radiation.

17. The apparatus of claim 16 wherein the second laser comprises a continuous wave laser.

18. A method for adjusting the gram load of a slider comprising the steps of:

taking a measurement of the gram load of a suspension;

positioning an end of an optical fiber in the vicinity of the suspension, the optical fiber being coupled optically to a laser for transmitting a first laser beam to the suspension, the end of the optical fiber being angled so that the end redirects the first beam of laser radiation approximately ninety degrees to the longitudinal axis of the optical fiber;

using a control device to determine a type of laser radiation to be used as the first beam to cause a desired bend in the suspension; and irradiating a region of the suspension with the first laser beam.

19. A method for adjusting the pitch static attitude of a slider comprising the steps of:

measuring the pitch static attitude of the slider;

positioning an end of an optical fiber in the vicinity of the suspension, the optical fiber being coupled optically to a laser for transmitting a first laser beam to the suspension, the end of the optical fiber being angled so that the end redirects the first beam of laser radiation approximately ninety degrees to the longitudinal axis of the optical fiber; and irradiating a plurality of spots on a load beam that supports the slider with a laser, with the plurality of spots being positioned along a line that extends across the width of the load beam.

20. A method for adjusting the roll static attitude of a slider comprising the steps of:

measuring the roll static attitude of the slider;

positioning an end of an optical fiber in the vicinity of the suspension, the optical fiber being coupled optically to a laser for transmitting a first laser beam to the suspension, the end of the optical fiber being angled so that the end redirects the first beam of laser radiation approximately ninety degrees to the longitudinal axis of the optical fiber; and irradiating a plurality of spots on a load beam that supports the slider with a laser, with the plurality of spots being positioned along a line that extends approximately half way across the width of the load beam.

* * * * *